United States Patent
Richter et al.

(10) Patent No.: US 10,833,732 B2
(45) Date of Patent: Nov. 10, 2020

(54) SYSTEM FOR EXTENDING THE RANGE OF NEAR FIELD COMMUNICATION OF AN ELECTRONIC DEVICE TO COMMUNICATE WITH AN OBJECT OVER A USER SKIN

(71) Applicants: Wolfgang Richter, Vancouver (CA); Faranak Zadeh, Vancouver (CA)

(72) Inventors: Wolfgang Richter, Vancouver (CA); Faranak Zadeh, Vancouver (CA)

(*) Notice: Subject to any disclaimer, the term of this patent is extended or adjusted under 35 U.S.C. 154(b) by 0 days.

(21) Appl. No.: 16/738,333

(22) Filed: Jan. 9, 2020

(65) Prior Publication Data

US 2020/0220576 A1 Jul. 9, 2020

Related U.S. Application Data

(60) Provisional application No. 62/790,180, filed on Jan. 9, 2019.

(51) Int. Cl.
*H04B 5/00* (2006.01)
*H04W 4/80* (2018.01)

(52) U.S. Cl.
CPC ......... *H04B 5/0031* (2013.01); *H04B 5/0012* (2013.01); *H04B 5/0037* (2013.01); *H04B 5/0043* (2013.01); *H04W 4/80* (2018.02)

(58) Field of Classification Search
CPC .. H04B 5/0031; H04B 5/0037; H04B 5/0043; H04B 5/0012; H04W 4/80; H04W 4/185
USPC ............................................. 455/41.1
See application file for complete search history.

(56) References Cited

U.S. PATENT DOCUMENTS

| | | | |
|---|---|---|---|
| 2011/0022025 A1* | 1/2011 | Savoie | H04B 13/005 604/500 |
| 2016/0142106 A1* | 5/2016 | Pernisek | H04B 13/005 455/41.1 |
| 2017/0126282 A1* | 5/2017 | Fromm | H04B 5/0037 |
| 2018/0241483 A1* | 8/2018 | Park | H04B 13/005 |
| 2018/0292523 A1* | 10/2018 | Orenstein | G01S 13/862 |

* cited by examiner

*Primary Examiner* — Eugene Yun

(57) ABSTRACT

Disclosed is a system which extends NFC near field communication over a user's skin by converting electromagnetic signals into modulated alternating electric fields and vice versa. A modified patch is attached to an NFC device, which gets energized from its electromagnetic resonance which may contain data. The patch uses the energy to create an alternating electric field which couples into and spreads over a user's skin. The user may approach or touch objects which then get energized by the alternating electric field. The objects have a tag which modulates the electric field with data back over the user's skin to the patch, which then demodulates the data to modulate the NFC communication of the NFC device for further processing.

20 Claims, 3 Drawing Sheets

SYSTEM FOR EXTENDING THE RANGE OF NEAR FIELD COMMUNICATION OF AN ELECTRONIC DEVICE TO COMMUNICATE WITH AN OBJECT OVER A USER SKIN

CROSS-REFERENCE TO RELATED APPLICATION

This present application claims priority to U.S. Provisional Patent Application No. 62/790,180, entitled "A SYSTEM FOR EXTENDING THE RANGE OF NEAR HELD COMMUNICATION OF AN ELECTRONIC DEVICE TO COMMUNICATE WITH AN OBJECT OVER A USER" filed Jan. 9, 2019, all of which are incorporated herein by reference.

BACKGROUND OF THE INVENTION

1. Field of the Invention

The present invention generally relates to a system for extending NFC near field communication of an electronic device, and more particularly relates to a system for extending near field communication (NFC) of an electronic device its reach, functionality, and features for powering, identifying and communicating with an object over a user's dermis due to conductivity of the human skin (dermis).

2. Description of Related Art

NFC near field RF (radio frequency) communication requires an antenna coil of one near field RF communicator to be present within an alternating magnetic field (H field) generated by the antenna coil of another near field RF communicator by transmission of an RF signal (for example a 13.56 MHz signal) to enable the magnetic field (H field) of the RF signal to be inductively coupled between the communicators. The RF signal may be modulated to enable communication of control and/or other data.

Near Field Communication (NFC) is a set of protocols, e.g., smartphones or other devices to establish electromagnetic radio communication with each other by either touching the devices together, or bringing them into a sufficiently close proximity, say to a distance of typically 10 cm or less. NFC requires close proximity between transmitting/receiving elements, and as such is not an appropriate technology for control of the devices during their normal operation. Hence, NFC has been developed for, and used primarily in applications such as reading identifiers (IDs) of devices with or without power, and electronic payments, e.g. contactless payment or entry-cards.

NFC always involves an initiator device and a target device; the initiator device actively generates a radio frequency (RF) electromagnetic field that can optionally power a passive target device. This enables NFC target devices to take very simple form factors such as tags, stickers, key fobs, or cards that do not require relatively large power supplies. NFC peer-to-peer communication is possible, provided both devices are powered.

Thus, in order to support near field communications, NFC devices fall into two main areas: NFC tags and NFC readers/writers, NFC tags often securely store personal contacts, such as debit and credit card information, loyalty program data, PINs, and networking contacts, among other information. NFC tags requires to be in close proximity with NFC readers. NFC competes with optically readable codes (e.g. OR).

There is ongoing demand in the market to increase the range of the NFC and simplify selective processes without losing on the speed of the communication. Therefore, there is a need for a system for extending the range of near field communication of an electronic device for powering and communicating with an object over the user, who simply approaches or touches the object.

SUMMARY OF THE INVENTION

In accordance with teachings of the present invention, a system for extending range of near field communication (NFC) of an electronic NFC device to communicate with an object over a user's skin.

An object of the present invention is to provide a system including a patch is attached to the electronic NFC device, and a tag is attached to the object for communicating with the patch using the near field communication of the electronic NFC device over the user's skin. The patch includes a coupling coil, a capacitor, a convertor, a frequency, a first electrode, a convertor modulator, a data modulator, a filter/mixer, a switchable load unit, and a first floating electrode. The tag includes a second electrode, a modulator and a second floating electrode.

The coupling coil interchanges electromagnetic energetic signals containing data received from the electronic NFC device. The capacitor resonates with the coupling coil at near-field frequency. The converter generates DC from the electromagnetic energetic signals from the electronic NFC device. The frequency generator generates a frequency. The first electrode couples capactively with the user's skin.

The converter modulator converts electromagnetic signals from the near field communication of the electronic NFC device into data modulation. The convertor modulator modulates the data with an alternating electric field of the frequency which emits from the first electrode.

The data demodulator extracts data from a modulating alternating electric field received from the tag in proximity of the user. The filter/mixer propagates the frequency generated by the frequency generator and further communicates de-(modulated) data via the alternating electric field. The switchable load unit modulates data received from the data demodulator and communicates to the electronic device through the near field communication. The first floating electrode couples to earth's ground to close the electric circuit.

The tag includes a second electrode, a modulator, and a second floating electrode. The second electrode receives the modulated alternating electric field emitted from the first electrode over the user's skin. The modulator powered from the received alternating electric field, further communicates changes in the electric field over the second electrode, further the modulator modulates the alternating electric field with an identification ID and object data received from the filter mixer over the user's skin using the first electrode. The second floating electrode which couples the alternating electric field to the earth's ground potential.

Another object of the present invention is to provide a system with a patch, a hub and a tag. The hub includes a frequency generator, an electrode and a filter mixer.

Another object of the present invention is to provide the system wherein the patch includes a filter to suppress alternating electric field frequency and links the demodulated data to the switchable load unit, and a bi-directional communication unit for communicating data over a communication network.

BRIEF DESCRIPTION OF DRAWINGS

Further details, aspects and embodiments of the invention will be described, by way of example only, with reference to the drawings. In the drawings, like reference numbers are used to identify Ike or functionally similar elements. Elements in the FIG. are illustrated for simplicity and clarity and have not necessarily been drawn to scale.

DETAILED DESCRIPTION OF DRAWINGS

Figure 1:
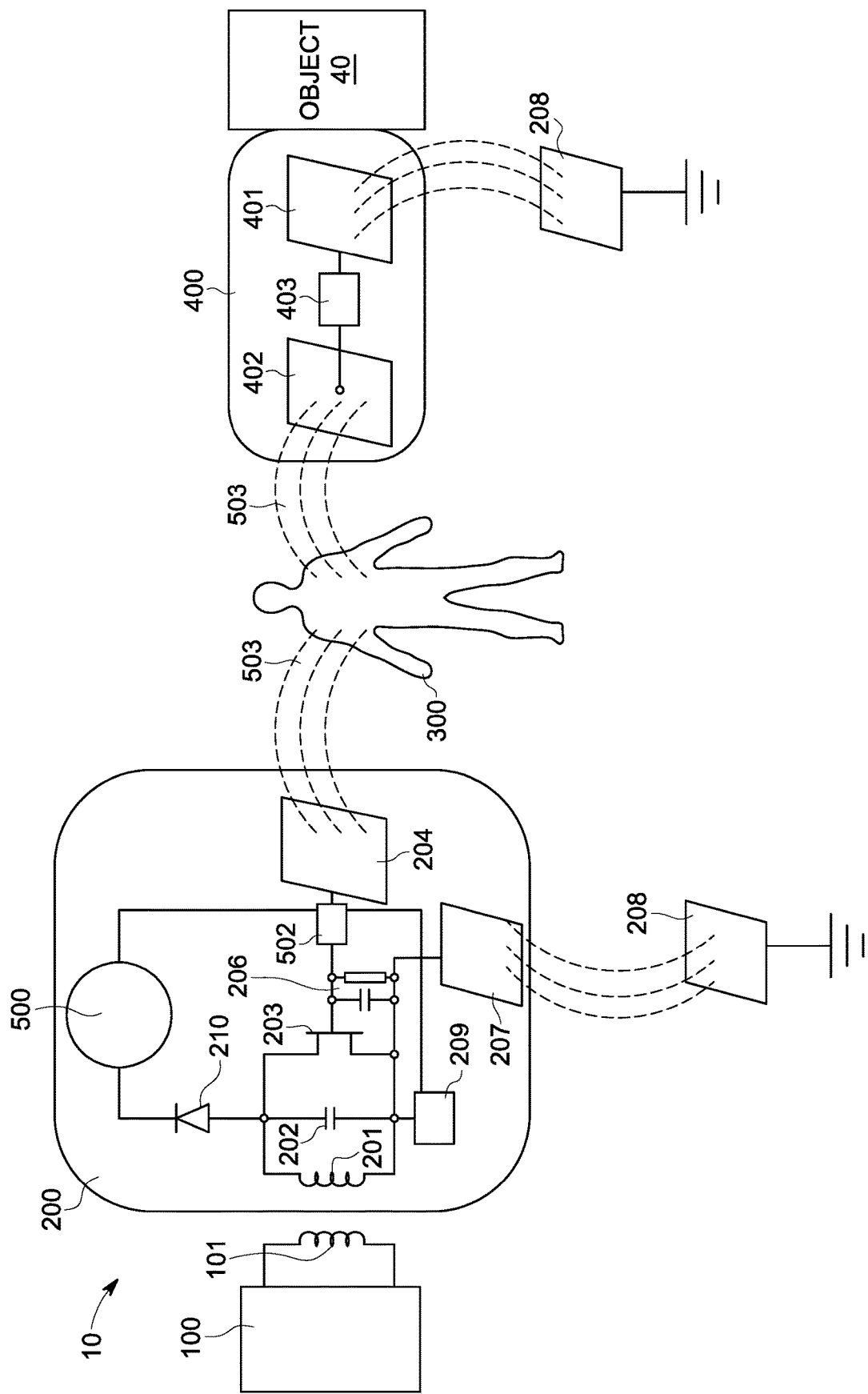
FIG. 1 illustrates a schematic diagram of a system for extending the range of near field communication (NFC) of an electronic device for communicating with an object over a user's skin.

While this technology is illustrated and described in a preferred embodiment, a system for extending the range of near field communication of an electronic NFC device for communicating with an object over the user's skin may be produced in many different configurations, shapes, sizes, forms and materials. This is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

As the human skin is a conductive surface it can propagate direct or indirect (e.g. due capacitive coupling) electrical energy and signals between electronic devices. NFC forces the user to scan an NFC tagged object with the NFC smart device. Therefore, the focus is not on the object rather than on operating the smart device.

Physically touching or approaching an object of interest is more convenient, comfortable, timesaving, or more useful while the smart device provides a related action or feedback in the background. This is even more important if the object has to be manually operated during a process (e.g. for safety reasons), or is difficult or uncomfortable to reach with the smartphone for example, if sensing objects are attached or near the user's body (e.g. for sport/fitness/health monitoring or in safety equipment).

The present application teaches an improved embodiment of an NFC tag that is attached to the smart device (e.g. as a sticker on the backside) while the selection and digital communication with the objects happen via the user's skin utilizing a data modulated (non-magnetic) alternating electric field. The alternating electric field is provided from the NFC tag or an external source in reach of the user or the object. The electric field lines concentrate on the fingertips of the user's hand which allows a very precise selection among many objects on shelves.

Therefore, the objects are attached with invention related tags, stickers, or labels, which are (battery-free) powered and operated by the alternating electric field. If the user approaches or touches such an object his skin is influenced by said alternating electric field acting as a kind of "momentary switch" (or electrical bridge) between the invention related Tag on an object and the NFC tag attached to the smart device which likewise is in reach of the user (yet not necessarily in his other hand).

FIG. 1 illustrates a schematic diagram of a system 10 for extending range of near field communication (NFC) of an electronic NFC device 100 for communicating with an object 40 over the user's 300 skin. The system 10 includes a patch 200 attached to the electronic NFC device 100 and a tag 400 attached to the object 40. Examples of the electronic device 100 includes but not limited to smartphones, tablets, smart watches, smart (wrist) bands or other electronic devices with NFC reader.

The patch 200 is attached either in the housing or outside the housing of the related electronic NFC device 100. Preferably, the patch 200 is attached near to NFC coil 101 of the electronic device 100. Examples of the object 40 includes but not limited to body patches (tattoos, stickers), wearables, jewelry, accessories, medical devices, fitness devices, music or entertainment devices, furniture, implants, protection devices, animals, vegetables, plants, fruits, battery operated products (smart phones, smart watches), products in a retail market and other similar type of products. Also, the patches 200 and/or the invention related tag 400 may be embedded into interior, (vehicle-)seats, furniture, carpets etc.

The patch 200 includes a coupling coil 201, a capacitor 202, a switchable load unit 203 (e.g. MOSFET), a first electrode 204, a data modulator 205, a converter modulator 209, a converter 210, a frequency generator 500, a filter mixer 502, and a first floating electrode 207. The coupling coil 201 interchanges electromagnetic energetic signals containing data received from the NFC coil 101 of the electronic NFC device 100.

The capacitor 202 resonates with the coupling coil 201 at near field communication frequency. For exemplary purposes, the near field communication frequency is 13.5 MHz. The converter 210 generates DC from the electromagnetic energetic signals from the electronic NFC device 100.

The frequency generator 500 generates a frequency. The filter mixer 502 propagates the frequency generated by the frequency generator 500. The filter mixer 502 further communicates demodulates/modulates data via the alternating electric field 503. The first floating electrode 207 couples capacitively to earth's ground to close the circuit.

The switchable load unit 203 (e.g. transistors, MOSFET, TRIAC, relays etc.) modulates data received from the data modulator 205 and communicates the data to the electronic NFC device 100 through the near field communication. The first electrode 201 couples capactively to emit an alternating electric field over the user's 300 dermal skin. The data demodulator 205 (e.g. diodes, Greatz bridges, low pass filters) extracts data from modulating alternating electric field received from the tag 400 in proximity of the user.

In an embodiment of the present invention, the tag 400 and the patch 200 are made of a flexible material such as polymer, textile and other similar materials. The tag 400 and the patch 200 are generally flat/planar sheet with adhesive on one side to be attached to the object and the NFC device, respectively. However, those skilled in the art may envision various shapes and material of the tag 400 and the patch 200, without deviating from the scope of the present invention.

The tag 400 is attached to the object 40. The tag 400 includes a second electrode 402, a modulator 403 and a second floating electrode 401. The second electrode 402 receives and modulates the alternating electric field emitted from the first floating electrode 207 over the user. The modulator 403 gets powered from the generated alternating electric field and further communicate changes in the electric field over the second electrode 402.

Further, the modulator 403 modulates the alternating electric field with an internal identification (ID) or object data or a sensing result and demodulates data provided by the filter/mixer 502 over the user's skin coupling with the first electrode 204. The second floating electrode 401 couples the alternating to the earth's ground potential which completes the circuit. The system 10 extends the NFC range by allowing the alternating electric field to couple and spread out over the user's skin and couples with the object 40 through the tag 400.

For exemplary purposes, a user goes to a retail shop for smart shopping. Every of a variety or plurality of products (40) has the tag 400 which contains product-related information of the 40. The user uses the NFC 101 coil of the electronic NFC device (e.g. smartphone) 100 to interact with the tag 400 to retrieve information of the product 40 by approaching, touching, or taking it. The patch 200 extends the NFC range over the user and influence the tag 400 with the alternating electric field (modulated with the data).

The patch 200 demodulates the data and sends it via the NFC coils 101/201 as NFC message to the smartphone 100 which has a software application or a network connection to process the data. Further in another embodiment of the present invention, the software application may ask the user if he would like to buy the related product or have more information. The user then confirms the requirements and thus interacts with the product. The software application may also have online payment methods to pay for the purchased product.

In an alternative embodiment, the smartphone 100 provides NFC data which the patch 200 converts into alternating electric field modulation over the user 300 and the product 40 having the tag 400. The user 300 is in proximity to the product 40 and allows remote processing for various applications including but not limited to tracking customers in retail, identification, cross-checking (e.g. triggering face and/or video recognition, voice recognition, augmented features or services, etc).

Further in another preferred embodiment of the present invention, the system 10 further facilitates transfer of power from the electronic device 100 to the object 400 via the user's skin. The object 400 receives energy over time and thus recharges itself through the patch 200. Thus, it allows users to power objects or other electronic devices (e.g. for display or illumination purposes) using his NFC device.

In another embodiment of the present invention, the patch 200 further includes a filter 206 to suppress alternating electric field frequency and links the demodulated data to the switchable load unit 203. The filter 206 is also termed as lowpass filter.

The patch 200 further includes a bi-directional communication unit (not shown in FIGURES) for communicating data with the electronic NFC device 100. Examples of the bi-directional communication unit includes but not limited to Bluetooth unit, Wi-fi unit, GSM, CDMA etc.

The tag 400 further includes at least one sensor (405, shown in FIGs. 2 & 3) to sense attributes from either the object 40 or the user 300 or the environment, and a light emitting element (406, shown in FIG. 3) attached to the object 40 to illuminate on detecting change in impedance of the alternating electric field. The light emitting element are controlled either by the electronic NFC device 100. The sensor and the light emitting element are explained in detail in conjunction with FIG. 2 and FIG. 3, respectively of the present invention.

Figure 2:
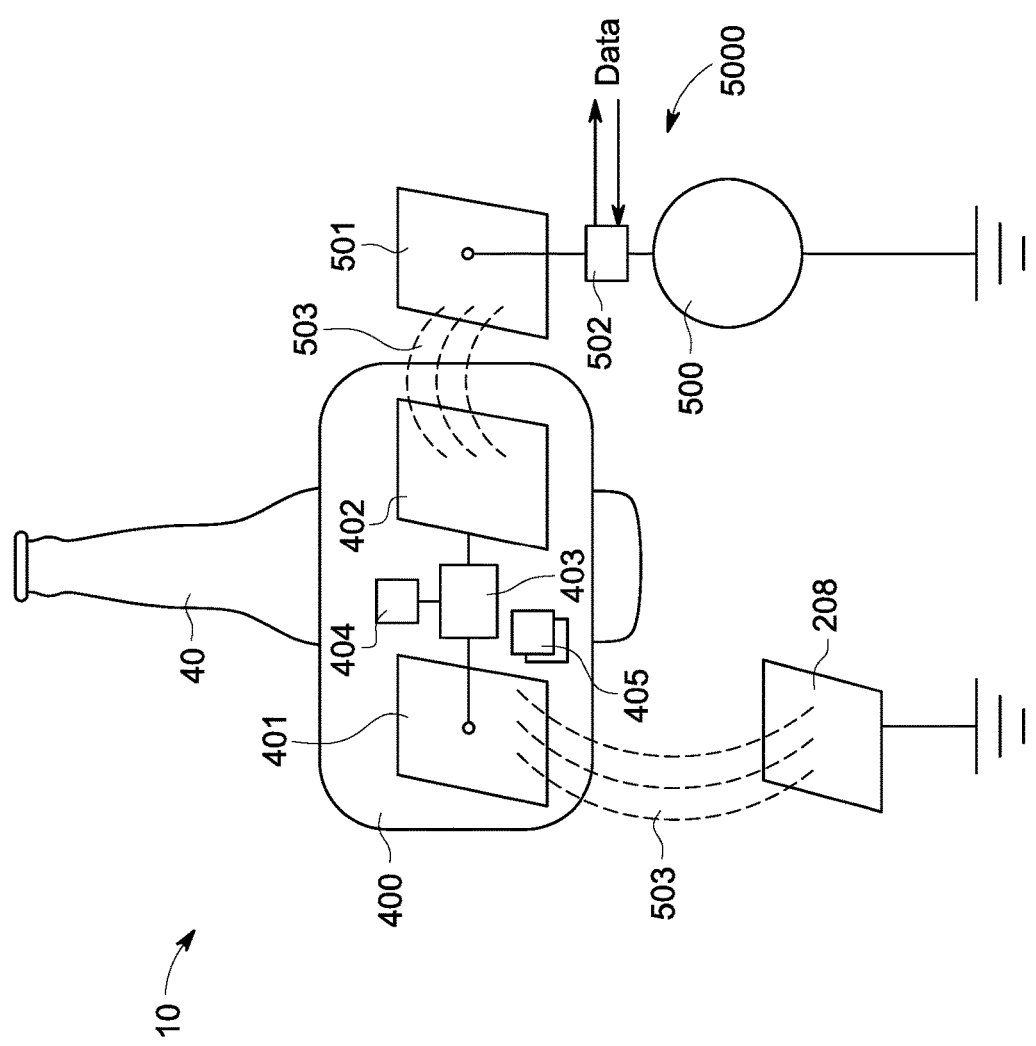
FIG. 2 illustrates a schematic diagram of the system interacting with an alternating electric field controlled object connected to a network receiving power from a hub in an embodiment of the present invention.

FIG. 2 illustrates a schematic diagram of the system 10 interacting with an alternating electric field controlled object 40 connected to a network receiving power from a hub 5000 in an embodiment of the present invention. The hub 5000 includes a generator 500, an electrode 501, and a filter/mixer 502.

The generator 500 creates a frequency that emits from the electrode 501 as an alternating electric field 503. The combined filter/mixer 502 resonates with the frequency from the generator 500 and (de-)modulates data (provided from or processed by connected controllers or networks) into/from the alternating electric field 503. The invention related patch 400 is attached to the object 40 which couples capactively with the alternating electric field 503 over the second floating electrode 402 (e.g. a conductive surface).

The modulator 403 rectifies and buffers DC energy as well as extracting an operating clock from the alternating electric field (charges) which the second floating electrode 402 received from the alternating electric field 503. The modulator 403 couples over the second electrode 401 to the earth's ground surface 208 creating a closed AC circuit with the generator 500.

The tag 400 includes a unique identification ID 404 which is stored in the modulator 403, and sensors 405 to assess physical and chemical attributes of the environment or the object 40 or the user. The modulator 403 modulates the alternating electric field 503 (e.g. due impedance modulation) with the unique identification ID 404 and/or data provided by the connected (or integrated) sensors 405. The modulator 403 senses and communicates the change in impedance of the alternating electric field caused by the object 40 approaching or touching user (300, shown in FIG. 1) to connected controllers or networks.

Examples of the sensors 405 include but not limited to temperature humidity sensors, markers to detect freshness, germs, infestation, inflammation, decay, etc. Examples of the generator 500 include but not limited to oscillators, pwm, toggled I/O pins, PLL, etc. Examples of the modulator 403 include, but no limited the active or passive mixers, multipliers, operational amplifiers, transistor circuits, etc. Examples of the filter/mixer 502 include, but not limited to highpass/lowpass, bandpass filter combinations, diodes, transistor, or operational amplifier mixers, FIR/FFT algorithms, etc.

Figure 3:
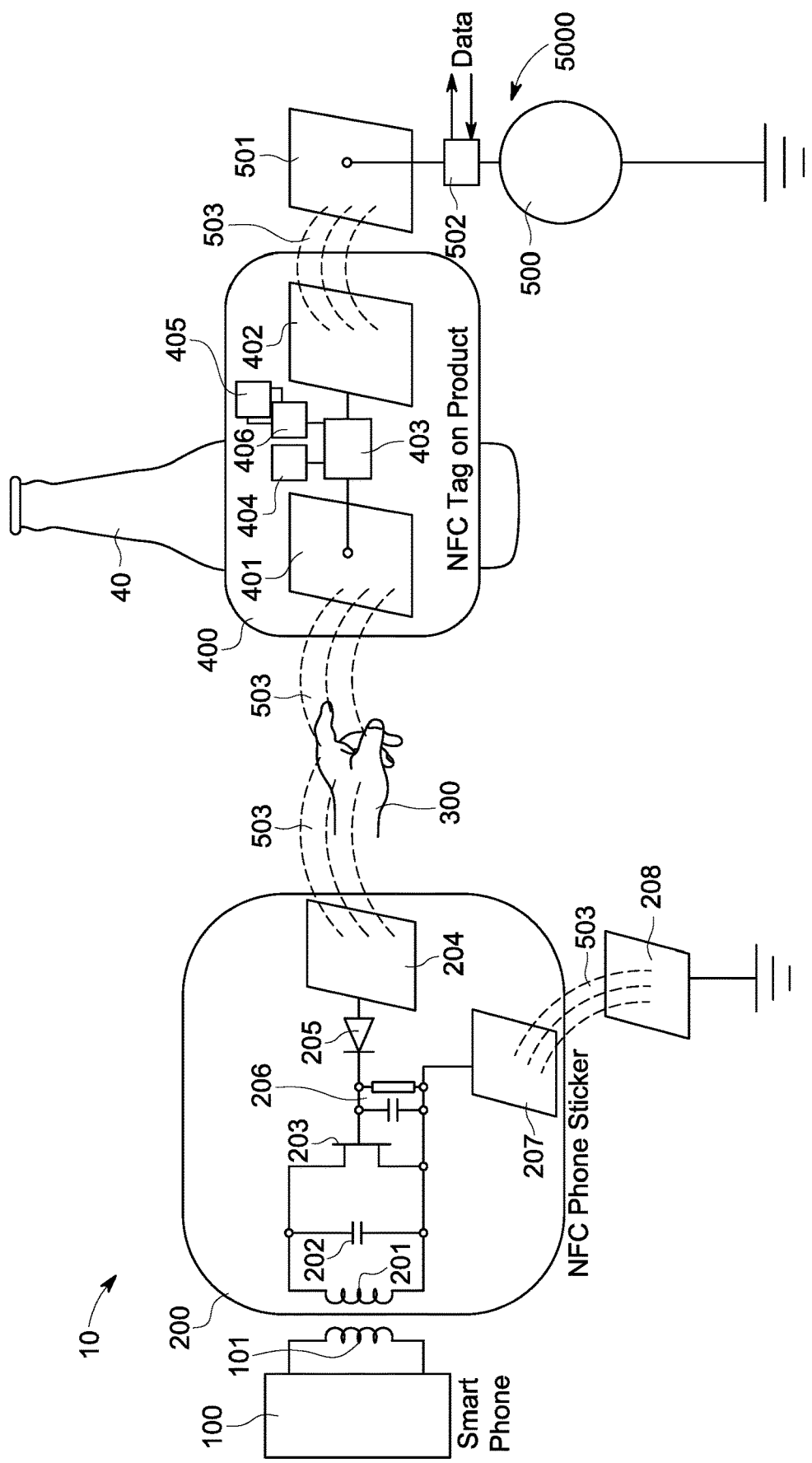
FIG. 3 illustrates a schematic diagram of the system for sensing and connecting the actions of a user and features of an approached object simultaneously to internal and external networks, computers, or applications receiving power from the hub.

FIG. 3 illustrates a schematic diagram of the system 10 for sensing and connecting the actions of the user 300 and features of an approached object 40 simultaneously to internal and external networks, computers, or applications receiving power from the hub 5000. The user 300 is influenced by the modulated alternating electric field 503 which couples with the electrode 204 of the patch (NFC) 200 attached to the user NFC electronic device 100. Examples of the communication network includes but not limited to internet, Bluetooth, NFC etc.

The modulated alternating electric field 503 is rectified by the data demodulator 205. The data is filtered out by a lowpass filter 206 and the modulator 203 modulates the electromagnetic resonator i.e. coupling coil 201 and the capacitor 202 which signals the NFC device 100 inductively receives with its NFC coupling coil 101.

The alternating electric field 503 couples against the surface 208 of the earth's ground via the first floating electrode 207. The electronic NFC device 100 process data (information) from the object 40, as well as from the capacitively connected controllers or networks via the filter mixer 502.

The electronic NFC device 100 transmits information capacitively to the tag 400. The tag 400 includes a modulator 403 to modulate the alternating electric field 503 with data bridged over the user's (300) skin. The modulated data alternating electric field emits from the electrode 401 and couples with the electrode 501. Further, the data is demodulated from the filter/mixer 502 and further processed from connected controllers, computers or networks.

Further the tag 400 includes at least one light emitting element 406 attached to illuminate on detecting change in impedance of the alternating electric field. Examples of light emitting element 406 includes but not limited to light emitting diodes (LED's), OLED's, Plasmas etc. The light emitting element 406 are controlled by the electronic NFC device or by external controllers or networks (through bi-directional communication units).

The present application offers various advantages and applications such as:

Keyless Entry Feature

For opening doors, compartments, space, and rooms, vehicles by approaching or touching a door handle (object 40) under the control of the smart electronic device (100) which may be concealed. The door handle (knob) 40 has integrated invention related circuitry and electromechanical means to provide the (un-) locking features.

Mobile fitness/healthcare/wellness monitoring (patch-network)

Extracting operation clock from the alternating electric field allows collision-free synchronized operation of a plurality of (battery-free) patches 400 which may be attached to a user's (300) body (40), clothes (40), or wearables (40), utilizing integrated or external sensors, which measure user actions, vital signs, physical forces, or chemical reactions. The provided alternating electric field (503) powers the patches 200 and Tacts as a medium for the bi-directional data transfer with the at least one smart device 100 equipped with the patch 200.

Medical or Cosmetic Implants

Dielectric physical features of alternating electric fields 503 allow the penetration or influence of organic tissue. The tag 400 for monitoring/sensing/stimulation devices is powered, operated, controlled or communicated by a nearby NFC device 100. The tag 400 further includes multiple electronic components for providing ionization, illumination, or nerve-, tissue- or blood- and other body liquids, stimulation, drug delivery, wound healing etc. The patch 400 can be combined with mechanical or neurological implants to enhance their functionality (or monitor or control their operation).

Enhanced Shopping Experience

Users 300 may be identified (e.g. by their smart devices defined applications) and grab products in a store, which are equipped with the tag 400 e.g. as labels, sticker logos, or integrated into lids or product packages. Multimedia advertising or product information may be launched on-demand if a certain product 40 with the tag 400 gets approached or touched by the user 300.

A software application may be programmed to measure impedance between the patch 200 and the tag 400 to detect if the product 40 is approached or touched. On touch, the user 300 confirms the acquisition and activate automated payment methods (known as 'GrabnGo'). A summoned salesperson, when entering the reach of the alternating electric field with an own NFC device receives the information about the customer and the product e.g. on earphones.

The present invention also allows the user 300 to experience augmented shopping. The system 10 prevents shoplifting or misplace of items. NFC smart device 100 (running shopping support applications) equipped with patch 200 may be attached to shopping carts. The invention also allows real-time inventory in shops and warehouses where tags 400 are attached to pallets, packages, products, shelves or racks.

Guided Machine/Robot Operations

While working with machines, users (workers) 300 need to stay focused on the operation to avoid accidents or damages. Also, the workers 300 need to be properly protected with adequate equipment for any given (often dangerous) situation at work. The alternating electric field 503 acts like a "synthetic aura" around the user's 300 body, no matter where the field couples in. Various machine parts in reach of the user 300 may be attached with tags 400, while the NFC device equipped with the patch 200 is near to the user 300. The alternating electric field may be provided either by patch 200 under the control of the NFC device, and or from an external source such as the frequency generator 500 over a conductive surface 501 (which e.g. may be a part of the machine).

The tags (e.g. stickers or integrated) 400 are attached to wearable protection devices create a sensing network with the acting user 300 and the machine. Using the invention, the machine operation may be monitored e.g. for quality purposes, worker well-being assessment, or pay-per-use situations etc. Robotic "co-workers" may adjust to the user's 300 action and performance.

Stop Texting and Driving

The tag 400 implemented in a vehicle's driver seat could be activated if the driver 300 touches the NFC smart device equipped with the patch 200, switching off the keypad to prevent the driver 300 from manual texting for safety reasons.

Location Based Services

The impedance of the alternating electric field changes if conductive or dielectric objects approach (acting as a filter component). For example, a person 300 is detected from up to 5 m. This allows creating zones where movement, speed and direction of the user 300 matter to provide location-related guidance, navigation or information (e.g. tradeshows, exhibitions, public spaces like museums, airports, train stations, commuting vehicles, offices etc).

If the alternating electric field is externally provided (as shown in FIG. 2), the system 10 allows differentiating if the approaching person has an NFC device equipped with patch 200, or not to provide appropriate support. Further, the invention may be implemented on floors to create "smart floors" which monitors user movements, where the floor has tags 400 underneath to detect, identify, and guide users 300, people, cleaning vehicles, allowing access control, counting, informing etc. Further, elevators are implementable with tags 400 to detect user's (300) ID when entering and are programmed to go to the right level (as a security feature).

Smart Textiles

Tag 400 embedded in textiles and fabric e.g. can enhance or augment human perception, supporting handicapped or entertain or safeguard people using their NFC smart devices, individual or in groups. The system 10 makes wiring and battery operation of such features obsolete, simplifies production, and protects against counterfeiting of (e.g. branded)

clothes. Similarly, the invention works in carpets, bedding, household linen, towels, mattresses, textiles for furniture, etc.

Home Appliances

Home appliances are seen as the base for "connected home" applications, normally connected via WiFi or BlueTooth. The present application offers an alternative using NFC devices 100 in combination with the alternating electric fields 503. Additionally, electric field lines let food stay longer fresh in refrigerator, and may prevent food wastage and spoilage.

Alternating electric fields may detect children and protect them e.g. playing with dangerous household devices (e.g. stove). During cooking, a user's (chef) 300 action may be monitored and supported with related information, while washing machines and dryers get information from the smart textile patches 400 equipped clothes.

The exemplary use cases mentioned above may be combined with each other as well as with other applications or services. Those who skilled in the art may envision various combination of applications without deviating from the scope of the present invention.

The exemplary embodiments herein disclosed are not intended to be exhaustive or to unnecessarily limit the scope of the invention. The exemplary embodiments were chosen and described in order to explain the principles of the present invention so that others skilled in the art form a part of the present invention and are embraced by the appended claims.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

The invention claimed is:

1. A system for extending range of near field communication (NFC) of an electronic NFC device to communicate with an object over a user's skin, the system comprising:
   a patch attached to the electronic NFC device; and
   a tag attached to the object for communicating with the patch using the near field communication of the electronic NFC device over the user's skin;
   wherein the patch comprising:
      a coupling coil to interchange electromagnetic energetic signals containing data received from the electronic NFC device;
      a capacitor resonating with the coupling coil at near-field frequency;
      a converter generates DC from the electromagnetic energetic signals from the electronic NFC device;
      a frequency generator for generating a frequency;
      a first electrode couples capactively with the user's skin;
      a converter modulator to convert electromagnetic energetic signals from the near field communication of the electronic NFC device into data modulation, further the convertor modulator modulates the data with an alternating electric field of the frequency which emits from the first electrode;
      a data demodulator to extract data from a modulating alternating electric field received from the tag in proximity of the user;
      a filter/mixer propagates the frequency generated by the frequency generator and further communicates de-(modulated) data via the alternating electric field;
      a switchable load unit modulates data received from the data demodulator and communicates to the electronic device through the near field communication; and
      a first floating electrode couples to earth's ground to close the electric circuit;
   wherein the tag comprising:
      a second electrode to receive the modulated alternating electric field emitted from the first electrode over the user's skin;
      a modulator powered from the received alternating electric field, further communicates changes in the electric field over the second electrode, further the modulator modulates the alternating electric field with an identification ID and object data received from the filter mixer over the user's skin using the first electrode; and
      a second floating electrode which couples the alternating electric field to the earth's ground potential.

2. The system according to claim 1 wherein the patch further comprising a filter to suppress alternating electric field frequency and links the demodulated data to the switchable load unit.

3. The system according to claim 1 wherein the patch further comprising a bi-directional communication unit for communicating data over a communication network.

4. The system according to claim 1 wherein the tag further comprising at least one sensor to sense attributes from at least one of the objects; and the user.

5. The system according to claim 1 wherein the tag is attached to a door handle for keyless access.

6. The system according to claim 1 wherein the object is at least one of a protection device; a tool; a machine; a textile; a carpet; a furniture; a garment; a robot; and a product.

7. The system according to claim 1 wherein the tag further comprising a light emitting element to illuminate on detecting change in impedance of the alternating electric field.

8. The system according to claim 7, wherein the illumination of light emitting element is controlled by the electronic NFC device.

9. The system according to claim 1 wherein the patch is attached to the object to secure against at least one of: theft; misplacement; and tampering, by identifying change in the location of the object on detecting change in impedance of the alternating electric field.

10. The system according to claim 1 where at least one tag is attached to the user.

11. A system for extending range of near field communication (NFC) of an electronic NFC device to communicate with an object over a user's skin, the system comprising:
   a patch attached to the electronic NFC device;
   a tag attached to an object for communicating with the patch using the near field communication of the electronic NFC device over the user's skin; and
   a hub to power the tag and further the hub creates an alternating electric field;
   wherein the patch comprising:
      a coupling coil to interchange electromagnetic energetic signals containing data received from the electronic NFC device;
      a capacitor resonating with the coupling coil at near-field frequency;

a converter generates DC from the electromagnetic energetic signals from the electronic NFC device;

a data demodulator to extract data from a modulating alternating electric field received from the tag in proximity of the user;

a switchable load unit modulates the data received from the data demodulator and communicates to the electronic NFC device through the near field communication; and a first floating electrode couples to earth's ground to close the electric circuit;

wherein the hub comprising:

a frequency generator for generating a frequency;

an electrode couples capacitively with the tag;

a filter mixer resonates the frequency generated by the frequency generator and further communicates de-(modulated) data via the alternating electric field emitted from the electrode;

wherein the tag comprising:

a second electrode to receive the modulated alternating electric field emitted from the electrode;

a modulator powered from the received alternating electric field, further communicates changes in the electric field over the second electrode, further the modulator modulates the alternating electric field with an identification ID and object data received from the filter mixer using the electrode; and a second floating electrode couples the alternating electric field to the earth's ground potential.

12. The system according to claim 11 wherein the patch further comprising a filter to suppress alternating electric field frequency and links the demodulated data to the switchable load unit.

13. The system according to claim 11 wherein the patch further comprising a bi-directional communication unit for communicating data over a communication network.

14. The system according to claim 11 wherein the tag further comprising at least one sensor to sense attributes from at least one of the objects; and the user.

15. The system according to claim 11 wherein the tag is attached to a door handle for keyless access.

16. The system according to claim 11 wherein the object is at least one of a protection device; a tool; a machine; a textile; a carpet; a furniture; a garment; a robot; and a product.

17. The system according to claim 11 wherein the tag further comprising a light emitting element to illuminate on detecting change in impedance of the alternating electric field.

18. The system according to claim 17, wherein the illumination of light emitting element is controlled by the electronic NFC device.

19. The system according to claim 11 wherein the patch is attached to the object to secure against at least one of: theft; misplacement; and tampering, by identifying change in the location of the object on detecting change in impedance of the alternating electric field.

20. The system according to claim 11 where at least one tag is attached to the user.

* * * * *